(12) United States Patent
Shellenberger

(10) Patent No.: US 9,221,002 B2
(45) Date of Patent: Dec. 29, 2015

(54) PULSE CLEANING FILTER SYSTEM ARRANGEMENT

(71) Applicant: AMEC FOSTER WHEELER NORTH AMERICA CORP., Hampton, NJ (US)

(72) Inventor: Jeffrey Shellenberger, Pittsburgh, PA (US)

(73) Assignee: AMEC FOSTER WHEELER NORTH AMERICA CORP., Hampton, NJ (US)

( * ) Notice: Subject to any disclaimer, the term of this patent is extended or adjusted under 35 U.S.C. 154(b) by 0 days.

(21) Appl. No.: 14/615,460

(22) Filed: Feb. 6, 2015

(65) Prior Publication Data

US 2015/0238889 A1    Aug. 27, 2015

Related U.S. Application Data

(60) Provisional application No. 61/944,759, filed on Feb. 26, 2014.

(51) Int. Cl.
| | |
|---|---|
| *B01D 46/04* | (2006.01) |
| *B01D 46/00* | (2006.01) |
| *F02C 7/04* | (2006.01) |
| *B01D 46/24* | (2006.01) |

(52) U.S. Cl.
CPC ........ *B01D 46/0068* (2013.01); *B01D 46/0002* (2013.01); *B01D 46/0019* (2013.01); *B01D 46/2403* (2013.01); *F02C 7/04* (2013.01)

(58) Field of Classification Search
CPC ... F02C 7/04–7/057; B01D 46/0002–46/0017; B01D 46/0019–46/0026; B01D 46/0067–46/0071; B01D 46/24–46/26
USPC .................................................. 55/301–302
See application file for complete search history.

(56) References Cited

U.S. PATENT DOCUMENTS

| | | | |
|---|---|---|---|
| 6,786,946 B2 | 9/2004 | Jung | |
| 7,195,659 B2 | 3/2007 | Sporre et al. | |
| 7,585,343 B2 | 9/2009 | Clements | |
| 7,918,908 B2 | 4/2011 | Nahey et al. | |
| 2002/0092423 A1 | 7/2002 | Gillingham et al. | |
| 2003/0200733 A1 | 10/2003 | Jung | |
| 2008/0022856 A1 | 1/2008 | Clements | |
| 2008/0229927 A1* | 9/2008 | Singh ................. | B01D 46/0021 95/281 |
| 2009/0272082 A1 | 11/2009 | Nahey et al. | |

OTHER PUBLICATIONS

Notification of and International Search Report and Written Opinion mailed May 13, 2015, in corresponding International Patent Application No. PCT/IB2015/051304.

* cited by examiner

*Primary Examiner* — Thomas McKenzie
(74) *Attorney, Agent, or Firm* — Fitzpatrick, Cella, Harper & Scinto

(57) ABSTRACT

A pulse cleaning filter system has a housing with an inlet side and an outlet side separated by a planar tubesheet. The housing includes multiple tubesheet openings forming multiple rows. Multiple cylindrical filter cartridges have an open end sealed around one of the tubesheet openings and a closed end at the inlet side of the housing. A filter cleaning system includes a compressed gas header extending perpendicular to a normal of the tubesheet, multiple compressed gas outlet stub pipes extending from the header, right angle pulse valves connecting each of the stub pipes to a pulse manifold pipe including a first straight portion, a ninety degree bend at the outlet side of the housing, and a second straight portion at the outlet side of the housing. A gas pulse nozzle has a main injection axis directed along the central axis of the filter cartridge.

20 Claims, 3 Drawing Sheets

PULSE CLEANING FILTER SYSTEM ARRANGEMENT

CROSS REFERENCE TO RELATED APPLICATION

This application claims the benefit of U.S. Provisional Application No. 61/944,759, filed on Feb. 26, 2014, which application is herein incorporated by reference.

BACKGROUND OF THE INVENTION

1. Field of the Invention

The present invention relates to a pulse cleaning filter system arrangement, which is especially applicable for the air intake of a gas turbine or a combustion turbine.

2. Description of the Related Art

The operation of a gas turbine or a combustion turbine requires the ingestion of a large volume of ambient air. Filtration of the ambient air by using an inlet filter system is required in order to protect the gas turbine or the combustion turbine from the negative effects of contaminated air, which include foreign object damage, erosion, and turbine blade fouling.

Generally, an inlet filter system comprises a housing with a tubesheet that separates the inlet side and the outlet side of the housing. The tubesheet comprises multiple tubesheet openings, each of which is associated with a filter cartridge. The filter cartridges have an open end sealed around the respective tubesheet opening and a closed end at the inlet side of the housing. The filter cartridges are usually conical or cylindrical cartridges, or combinations of these.

As a result of introducing an ambient air stream through the inlet filter system, particulate matter collects on the filter cartridges and tends to increase the flow resistance of the filter system. Occasionally, the filters need to be replaced, but more preferably, the filters are cleaned by using, for example, a reverse gas pulse cleaning approach. In the reverse gas pulse cleaning approach, gas pulses, typically, air pulses, are introduced periodically against the direction of the normal air stream through the tubesheet openings into the filter cartridges. The gas pulses remove particulate matter collected on the inlet surfaces of the filter cartridges, which tends to reduce the flow resistance of the filter system.

U.S. Pat. No. 7,195,659 B2 discloses a pulse cleaning filter system arrangement comprising a vertical compressed air header arranged at the inlet side of a vertical tubesheet, between V-style filter elements, and multiple immersion type pulse valves arranged one on top of the other in the air header. Each of the valves provides the ability to allow air pulses to flow along a blowpipe to the outlet side of the tubesheet and, after two slanted rectangular bends, via a nozzle through a tubesheet opening to the outlet surface of a filter element. The immersion style pulse headers are relatively expensive to fabricate and to install. The immersion type headers have the drawback of the internal blowpipes reducing the free volume available for the compressed air to be stored in the air header.

U.S. Patent Application Publication No. 2008/0022856 A1, issued as U.S. Pat. No. 7,585,343 B2 on Sep. 8, 2009, discloses a pulse cleaning filter system arrangement differing from that disclosed in U.S. Pat. No. 7,195,659 B2, in that relatively long two-piece filter cartridge pairs are used, and in that the one on top of the other arranged blowpipes are bent to extend as horizontal pipe sections at the outlet side of a tubesheet. The horizontal pipe sections cross with central axes of two adjacent filter element pairs, and air nozzles are arranged in the crossings so as to inject air pulses to the respective filter element pairs. The arrangement has the same weaknesses as the one described above. Moreover, bending and installing of the blowpipes is relatively complicated due to an additional bend required, in addition to a slanted ninety degree bend, for the alignment of the horizontal pipe sections at the outlet side of a tubesheet. The additional bend also increases the pressure drop of the air pulses, and thus limits the filter cleaning capacity. Utilizing long two-piece filter cartridge pairs limits the number of cartridges that can be effectively cleaned by a single pulse valve.

An object of the invention is to provide a simple pulse cleaning filter system arrangement in which at least some of the disadvantages of the prior art are minimized.

SUMMARY OF THE INVENTION

According to one aspect, the present invention provides a pulse cleaning filter system arrangement comprising a housing, with an inlet side and an outlet side separated by a planar tubesheet, comprising multiple tubesheet openings, the tubesheet openings being arranged in an array forming multiple rows extending in a first direction, multiple cylindrical filter cartridges having a length and a central axis, each of the filter cartridges having an open end sealed around a perimeter of one of the tubesheet openings and a closed end at the inlet side of the housing, and a filter cleaning system, comprising a compressed gas header extending in a second direction perpendicular to a normal of the tubesheet, multiple compressed gas outlet stub pipes extending from the header in the first direction, right angle pulse valves connecting each of the stub pipes to a pulse manifold pipe comprising a first straight portion, a ninety degree bend at the outlet side of the housing, and a second straight portion at the outlet side of the housing, wherein the first straight portion and the second straight portion are on a single plane, the second straight portion being parallel with the first direction and crossing with the central axes of a set of filter cartridges sealed around the perimeter of tubesheet openings in one of the multiple rows, and a gas pulse nozzle arranged at each crossing of the second straight portion with the central axis of a filter cartridge of the set of filter cartridges, the gas pulse nozzle having a main injection axis directed along the central axis of the filter cartridge.

The pulse cleaning filter system arrangement according to the present invention can advantageously be utilized, for example, for air intake of a gas turbine or a combustion turbine. The tubesheet can be horizontal or even slanted in some forms of the invention, but according to a most preferred embodiment of the present invention, the tubesheet is vertical. The first direction, i.e., the direction of the rows of the tubesheet openings, can, in some cases, be inclined, but according to a preferred embodiment of the present invention, the first direction is horizontal.

According to a preferred embodiment of the present invention, the multiple tubesheet openings are arranged in a square array forming multiple rows extending in a first direction and multiple columns extending in a second direction perpendicular to the first direction. According to a most preferred embodiment of the present invention, the square array forms horizontal rows of tubesheet openings at multiple vertical levels and multiple columns extending in a vertical direction. Thereby, advantageously, the gas header is vertical and the stub pipes extend in the horizontal direction from the gas header.

The compressed gas header can be outside of the housing, especially, in some small scale applications, or at the outlet side of the housing, but according to a preferred embodiment of the present invention, the compressed gas header is at the inlet side of the housing. When the compressed gas header is at the inlet side of the housing, each of the first straight portions of the pulse manifold pipe extend through the tubesheet to the outlet side of the housing. This arrangement allows easy access to the gas header and the pulse valves, for example, for servicing the pulse valves. The first straight portions are preferably directed perpendicular to the tubesheet, but, in some applications, it is also possible to have the first straight portions to some extent inclined, for example, for arranging the stub pipes between the filter cartridges.

According to a preferred embodiment of the present invention, the stub pipes are arranged as pairs of stub pipes extending from opposite sides of the compressed gas header to two opposite horizontal directions. In this case, the compressed gas header can be called a tee-style header. A tee-style header is inherently cheaper to fabricate than an immersion style pulse header shown, for example, in U.S. Patent Application Publication No. 2008/0022856 A1, issued as U.S. Pat. No. 7,585,343 B2 on Sep. 8, 2009. The pairs of stub pipes are preferably arranged on the header on each of the multiple vertical levels, and the first straight portion of each of the pulse manifold pipes extends parallel with a normal of the tubesheet.

An especially advantageous feature of the present invention is that the first straight portion and the second straight portion are on a single plane. Therefore, the pulse manifold pipe, i.e., the path of a gas pulse from the pulse valve to the second straight portion comprises merely a single ninety degree bend, and no additional alignment bends are needed. Therefore, the pressure drop in the manifold pipes is minimized, and high capacity cleaning pulses are obtained.

In order to further minimize the pressure drop in the first straight portions of the manifold pipes, the length of the first straight portions is advantageously relatively short. Therefore, the compressed gas header is advantageously arranged between the filter cartridges, i.e., within the region of the filter cartridges, at the inlet side of the housing. The distance from a centerline of the compressed gas header to the tubesheet is, thus, advantageously smaller than, or substantially equal to, the total overall length of each of the filter cartridges. However, because the filter cartridges according to a preferred embodiment of the present invention are advantageously clearly shorter than those of the prior art, the distance from the centerline of the compressed gas header to the tubesheet can alternatively be larger than the total overall length of each of the filter cartridges. Thereby, the stub pipes and the pulse valves may also advantageously be arranged outside of the region of the filter cartridges.

The filter cartridges can be of any conventional type, such as conical or cylindrical cartridges, or combinations of these. According to an especially advantageous embodiment of the present invention, however, the filter cartridges are of a single piece and of a straight and circular, cylindrical shape. In the other words, each of the multiple tubesheet openings is advantageously sealed by a single piece cylindrical filter cartridge. A cylindrical cartridge is cheaper to fabricate than is a conical cartridge. A single piece cartridge does not have a gasket or seal in the midpoint that could potentially fail, as with a back-to-back multi-piece cartridge pair.

Preferably, the filter cartridges are relatively short. According to a preferred embodiment of the present invention, the total overall length of each of the filter cartridges is from 75 centimeters to 100 centimeters, most preferably, about 91 centimeters (36 inches). Relatively short single piece filter cartridges are easier to install than are conventional two-piece cartridges. They can also be cleaned by pulses of a lesser volume than conventional filter cartridges, which are typically about 132 centimeters (52 inches) long, consisting of a 66 centimeter (26 inch) cone cartridge and a 66 centimeter (26 inch) straight cartridge.

Because the pulse valves according to the present invention are not immersion-type valves arranged within the compressed gas header as, e.g., in the U.S. Patent Application Publication No. 2008/0022856 A1, issued as U.S. Pat. No. 7,585,343 B2 on Sep. 8, 2009, but right angle pulse valves connecting the stub pipes to pulse manifold pipes, the pulse valves do not decrease the free volume of the gas header. Therefore, the present pulse valves are advantageous for providing relatively large compressed gas pulses. Because the pulse valves are not within the gas header, but outside of the header, the size of the pulse valves is not restricted. Thus, the pulse valves according to the present invention enable larger flow channels and higher gas flow rates, and thus, higher capacity cleaning pulses, than do conventional immersion-type valves.

Because of the large pulse volumes, high gas flow rates and relatively short filter cartridges, each pulse valve and pulse manifold pipe can be used to clean more filter cartridges, and more filter surface area, than corresponding manifold pipes shown in the prior art. Correspondingly, each of the second straight portions of the pulse manifold pipes preferably crosses with the central axes of a set of at least four filter cartridges, even more preferably, of a set of at least five filter cartridges, so as to inject cleaning pulses to the corresponding filter cartridges.

A pulse cleaning filter system arrangement according to the present invention provides a simple system that is inexpensive to manufacture and easy to service. Due to the improved performance of the pulse cleaning, particles accumulated in the filter cartridges are efficiently removed.

The above brief description, as well as further objects, features, and advantages of the present invention will be more fully appreciated by reference to the following detailed description of the currently preferred, but nonetheless, illustrative, embodiments in accordance with the present invention, when taken in conjunction with the accompanying drawings.

DETAILED DESCRIPTION OF THE INVENTION

Figure 1:
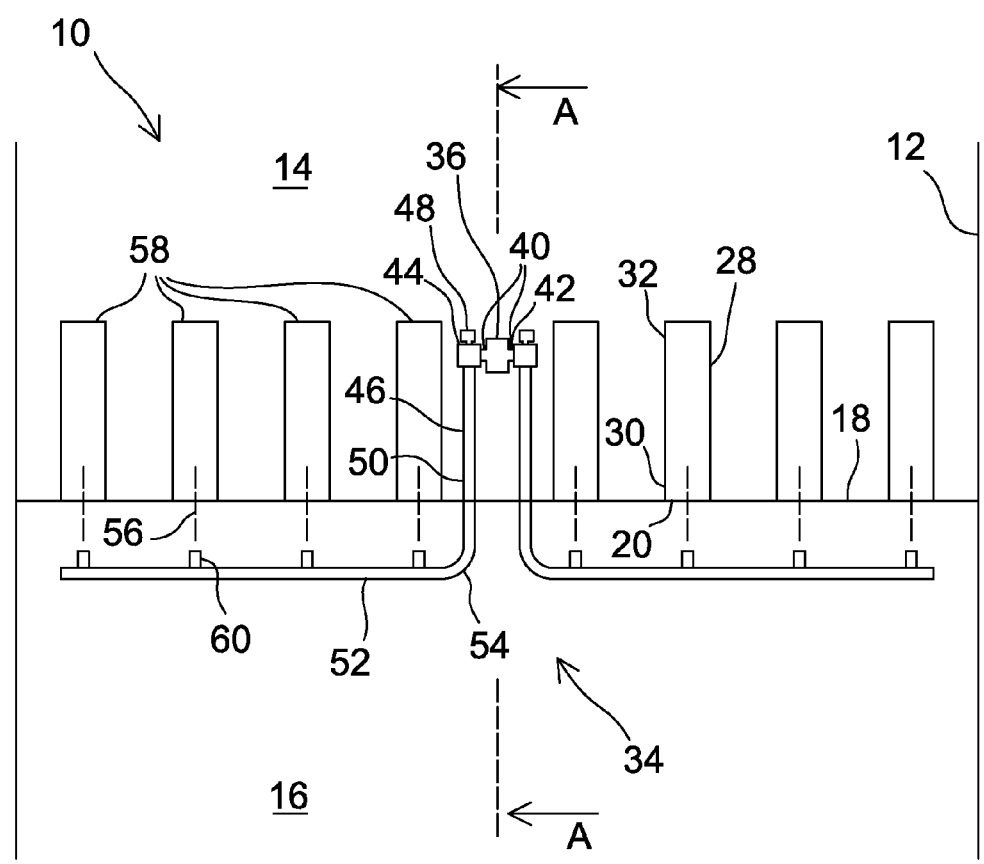
FIG. 1 shows a schematic top view of a pulse cleaning filter system arrangement according to an embodiment of the present invention.
Figure 2:
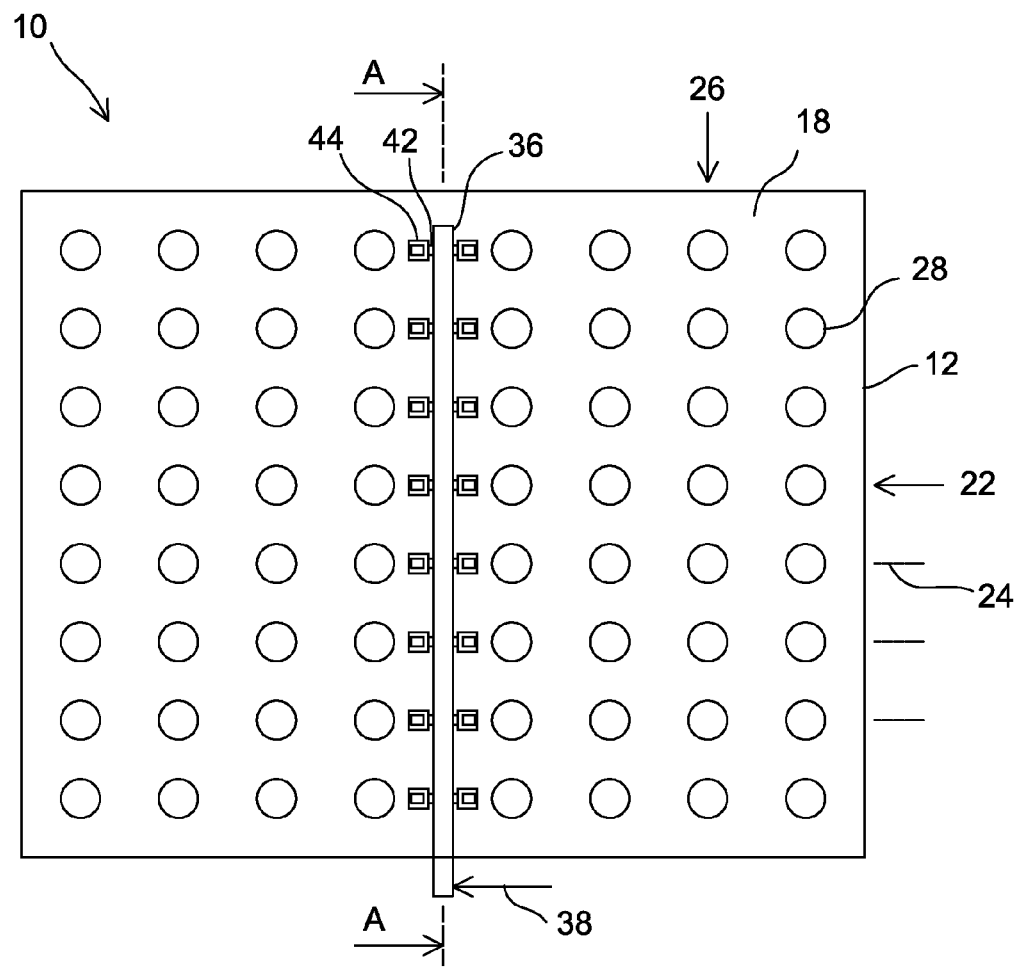
FIG. 2 shows a schematic a side view of a pulse cleaning filter system arrangement according to an embodiment of the present invention.
Figure 3:
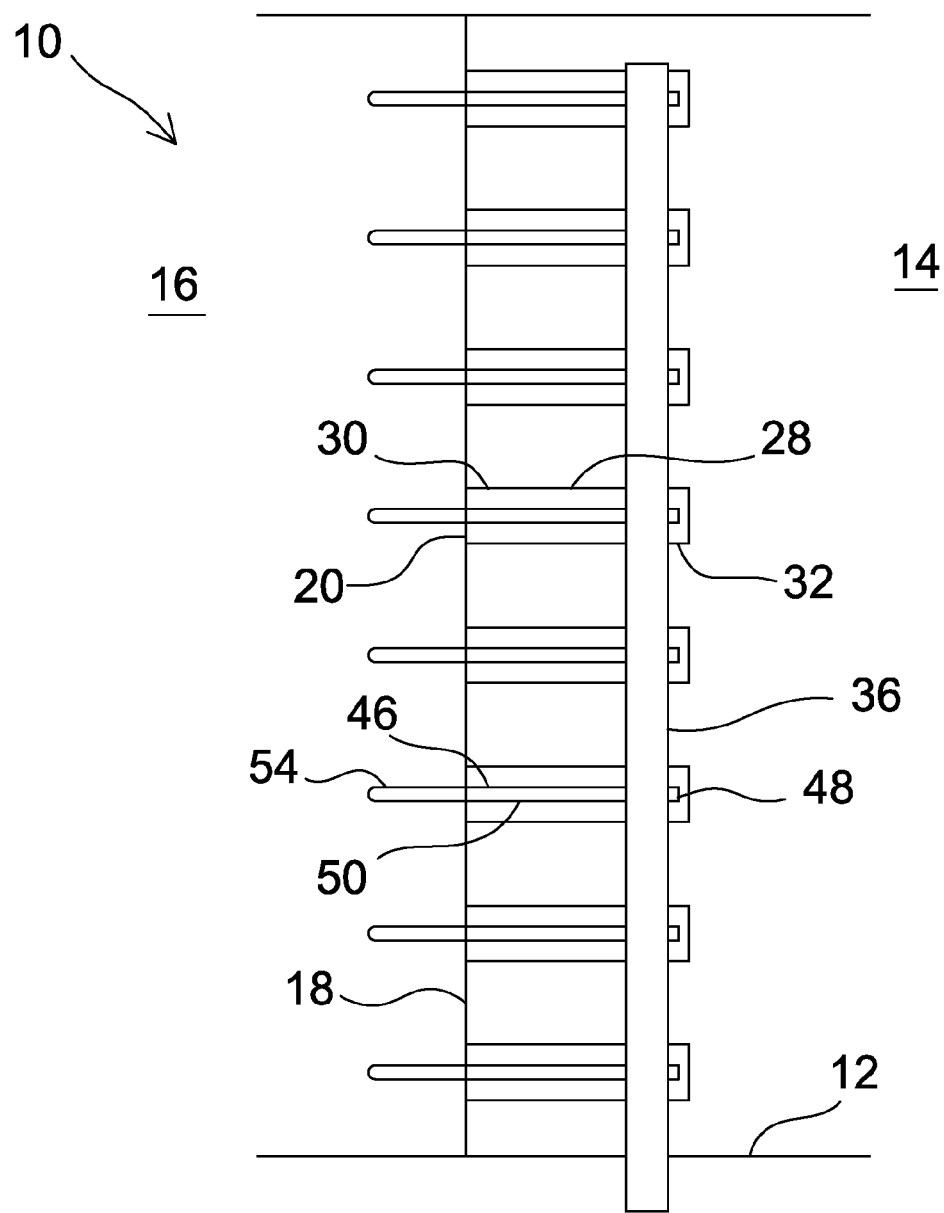
FIG. 3 shows a schematic cross-sectional view of a pulse cleaning filter system arrangement according to an embodiment of the present invention.

FIGS. 1, 2, and 3 schematically depict a top view, a side view from the inlet side, and a cross-sectional view along line A-A in FIGS. 1 and 2, respectively, of a pulse cleaning filter system arrangement 10, according to an embodiment of the present invention. The pulse cleaning filter system arrangement 10 can be utilized, for example, for separating harmful particulates from ambient air for a gas turbine by forcing the ambient air through the filter system.

The pulse cleaning filter system arrangement 10 comprises a housing 12 with an inlet side 14 and an outlet side 16, separated by a vertically arranged planar tubesheet 18. The tubesheet 18 comprises multiple tubesheet openings 20 arranged in a square array of horizontal rows 22, at multiple vertical levels 24, and vertical columns 26. Each of the tubesheet openings 20 is associated with a cylindrical filter cartridge 28 having an open end 30 sealed around the perimeter of the tubesheet opening 20 and a closed end 32 at the inlet side 14 of the housing 12.

The arrangement 10 comprises a reverse pulse cleaning system 34 for removing collected particles from the filter cartridges 28. The reverse pulse cleaning system 34 comprises a vertical compressed gas header 36 arranged between two vertical columns 26 of filter cartridges 28, at the inlet side 14 of the housing 12. When in operation, the gas header 36 comprises air or other suitable pulse gas, such as flue gas, at a desired pressure, such as about two to about eight atmospheres. The pressure is advantageously maintained by a conventional gas supply 38.

Pairs 40 of compressed gas outlet stub pipes 42, one on top of the other, extend horizontally from the header 36 to opposite directions at each vertical level 24 of the rows 22 of tubesheet openings 20. Each stub pipe 42 is connected with a right angle pulse valve 44 to a pulse manifold pipe 46 so as to allow filter cleaning gas pulses through the pulse manifold pipes 46 to the filter cartridges 28. The pulse valves 44 are advantageously equipped with quick acting solenoid valves 48 to enable generating gas pulses of a predetermined duration, such as from 0.05 seconds to 0.5 seconds, from the gas header 36 to the respective pulse manifold pipe 46. The gas in the gas pulses is preferably air, but, in some applications, it can also be another gas, such as flue gas. The quick acting solenoid valves 48 are preferably integral to the right angle pulse valves 44, but, in some applications, they can be remote from the pulse valves 44 and connected by tubing.

Each pulse manifold pipe 46 consists of a horizontal first straight portion 50 extending directly to the tubesheet 18, and, through the tubesheet 18, to the outlet side 16 of the housing 12. The first straight portion 50 is connected to a second straight portion 52 by a sole ninety degree bend 54 at the outlet side 16 of the housing 12. The first straight portion 50 and the second straight portion 52 are thus on a single plane. The second straight portion 52 extends horizontally at the outlet side 16 of the housing 12, parallel with the tubesheet 18.

The second straight portion 52 of each of the pulse manifold pipes 46 crosses with the central axes 56 of a set 58 of at least four filter cartridges 28 associated with tubesheet openings 20 in one of the horizontal rows 22 of tubesheet openings 20. A gas pulse nozzle 60 is arranged at each crossing of the second straight portion 52 with the central axis 56 of a filter cartridge 28, so that the main injection direction of the nozzle 60 is along the central axis 56 of the filter cartridge 28. Thus, the gas pulses are directed to the filter cartridges 28 in a direction opposite to the normal flow of the ambient air. The gas pulses dislodge particulates from the filter cartridges 28, whereby the dislodged particles reduce the flow resistance of the filter system. Cleaning of all filter cartridges 28 of the filter system is usually performed according to a predetermined sequence while the gas turbine is operating.

The gas pulse nozzles 60 can be of any suitable type, depending, for example, on the type of the filter cartridges 28. According to a preferred embodiment of the present invention, the nozzles 60 are connected directly to the second straight portion 52. The outlet ends of the gas pulse nozzles 60 are at a suitable distance from the tubesheet 18, such as about 15 to about 50 centimeters.

FIGS. 1 to 3 show a pulse cleaning filter system arrangement 10 with eight rows and eight columns of tubesheet openings 20, or filter cartridges, wherein each pulse valve provides cleaning gas pulses to four filter cartridges 28. In practice, the number of rows in a filter system can be less than or greater than eight, and the number of columns served by a single gas header 36 can be greater than eight, such as ten or twelve. It is also possible that a pulse cleaning filter system arrangement 10 comprises multiple compressed gas headers 36 arranged side-by-side, so as to enable a large filter system with a large number, such as twenty or even more, of columns of the filter cartridges 28.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

I claim:

1. A pulse cleaning filter system arrangement comprising:
a housing, with an inlet side and an outlet side separated by a planar tubesheet, wherein the planar tubesheet comprises multiple tubesheet openings, each tubesheet opening comprising a cylindrical filter cartridge attached thereto, each cylindrical filter cartridge having a total overall length, a central axis, an open end sealed around a perimeter of the tubesheet opening, and a closed end at the inlet side of the housing, wherein the tubesheet openings are arranged in an array forming multiple rows extending in a first direction such that each row defines a set of the cylindrical filter cartridges attached to the tubesheet openings; and
a filter cleaning system, disposed within the housing, comprising a compressed gas header extending in a second direction perpendicular to the normal direction of the planar tubesheet, multiple compressed gas outlet stub pipes extending from the header in the first direction, each gas outlet stub pipe being connected to a pulse manifold pipe by a right angle pulse valve, each pulse manifold pipe comprising a first straight portion, a ninety degree bend at the outlet side of the housing, a second straight portion at the outlet side of the housing, and a plurality of gas pulse nozzles attached to the second straight portion, wherein (i) the first straight portion and the second straight portion are on a single plane, and (ii) the second straight portion is parallel with the first direction, wherein the second straight portion crosses one of the sets of the cylindrical filter cartridges such that the second straight portion crosses the central axis of each cylindrical filter cartridge disposed in the set, wherein each nozzle of the plurality of nozzles is directed along the central axis of a respective cylindrical filter cartridge such that each nozzle has a main injection axis directed along the central axis of the respective cylindrical filter cartridge.

2. The pulse cleaning filter system arrangement according to claim 1, wherein each set comprises at least four of the cylindrical filter cartridges.

3. The pulse cleaning filter system arrangement according to claim 2, wherein each set comprises at least five of the cylindrical filter cartridges.

4. The pulse cleaning filter system arrangement according to claim 1, wherein each cylindrical filter cartridge is a single piece straight filter cartridge.

5. The pulse cleaning filter system arrangement according to claim 4, wherein the total overall length of each cylindrical filter cartridge is from seventy-five centimeters to one hundred centimeters.

6. The pulse cleaning filter system arrangement according to claim 5, wherein the total overall length of each of the cylindrical filter cartridge is ninety-one centimeters.

7. The pulse cleaning filter system arrangement according to claim 1, wherein the compressed gas header is at the inlet side of the housing.

8. The pulse cleaning filter system arrangement according to claim 7, wherein the first straight portion of each pulse manifold pipe extends through the planar tubesheet to the outlet side of the housing.

9. The pulse cleaning filter system arrangement according to claim 1, wherein the array is a square array.

10. The pulse cleaning filter system arrangement according to claim 9, wherein the tubesheet is vertical and the first direction is horizontal, wherein each row of the multiple rows is horizontal such that each row is provided at a different vertical level compared with the other rows of the multiple rows.

11. The pulse cleaning filter system arrangement according to claim 10, wherein the gas header is vertical and the stub pipes extend in a horizontal direction from the gas header.

12. The pulse cleaning filter system arrangement according to claim 11, wherein the stub pipes are arranged as pairs, each stub pipe in the pair extending in an opposite horizontal direction from the gas header compared with the other stub pipe in the pair.

13. The pulse cleaning filter system arrangement according to claim 12, wherein each pair of stub pipes is provided at a different vertical level compared with the other pairs.

14. The pulse cleaning filter system arrangement according to claim 13, wherein the first straight portion of each of the pulse manifold pipes extends parallel with a normal of the planar tubesheet.

15. The pulse cleaning filter system arrangement according to claim 7, wherein the distance from a centerline of the gas header to the planar tubesheet is less than the total overall length of each cylindrical filter cartridge.

16. The pulse cleaning filter system arrangement according to claim 7, wherein the distance from a centerline of the gas header to the planar tubesheet is greater than the total overall length of each filter cartridge.

17. The pulse cleaning filter system arrangement according to claim 7, wherein the distance from a centerline of the gas header to the planar tubesheet is equal to the total overall length of each of filter cartridge.

18. The pulse cleaning filter system arrangement according to claim 1, wherein the pulse cleaning filter system arrangement is utilized for the air intake of a gas turbine or a combustion turbine.

19. The pulse cleaning filter system arrangement according to claim 1, wherein the tubesheet is horizontal.

20. The pulse cleaning filter system arrangement according to claim 1, wherein the tubesheet is slanted.

* * * * *